United States Patent [19]

Montgomery, III

[11] 3,717,724

[45] Feb. 20, 1973

[54] SOLID STATE MULTI-COLOR SENSOR

[75] Inventor: William E. Montgomery, III, Severna Park, Md.

[73] Assignee: Westinghouse Electric Corporation, Pittsburgh, Pa.

[22] Filed: Feb. 2, 1971

[21] Appl. No.: 111,810

[52] U.S. Cl. ........178/5.4 R, 178/5.4 ST, 313/65 AB, 313/66, 317/235 N

[51] Int. Cl. ............................H01j 31/26, H04n 9/06

[58] Field of Search .........178/5.4 R, 5.4 BD, 5.4 ST; 307/311; 317/235 N; 313/65 AB, 66, 68 R

[56] References Cited

UNITED STATES PATENTS

| | | | |
|---|---|---|---|
| 2,614,235 | 10/1952 | Forgue | 178/5.4 ST |
| 3,478,214 | 11/1969 | Dillman | 317/235 N |

*Primary Examiner*—Robert L. Griffin
*Assistant Examiner*—George G. Stellar
*Attorney*—F. H. Henson

[57] ABSTRACT

A solid state sensor comprises multiple layers of semiconductor material having selectively wavelength absorption characteristics in accordance with predetermined regions of a spectrum to be detected. Arrays of contact elements provide selective connection to elemental areas of each layer and enable selective scanning of the elemental areas for deriving an output signal from each layer. Both electron beam scanning and electrical switching in a matrix-type scan are provided, permitting simultaneous derivation of multiple color output signals from the sensor. A specific application is a three color sensor for a color television camera.

27 Claims, 4 Drawing Figures

SOLID STATE MULTI-COLOR SENSOR

BACKGROUND OF THE INVENTION

1. Field of the Invention

This invention relates to a color television sensor and, more particularly, to such a sensor constructed in accordance with solid state semiconductor technology and employing electron beam and/or X-Y mosaic switching for the scanning processes.

2. State of the Prior Art

Color television sensors known heretofore in the art generally utilize a plurality of individual sensor elements, each having associated therewith a separate filter or being so constructed that each has a predetermined response sensitivity in a particular region of the visible spectrum. Typically, a plurality of images are derived from the image of the primary or field lens of the television camera, using a combination of filters, beam splitters, and/or dichroic mirrors, and projected onto the plurality of sensors. The sensors produce a corresponding plurality of video signals which are then processed to produce the required color television signal. The apparatus necessary for constructing a camera as described, and particularly utilizing three or four separate sensors and associated optical separation and electronic control components, results in a camera which is large in physical dimensions, is heavy in weight, and is very expensive.

A number of techniques have been pursued and proposed heretofore for overcoming these defects of prior art color television cameras. As one example, electro-mechanical color-wheel cameras have been developed which have reduced some of the weight and size problems. These cameras, however, require complex and expensive equipment to convert the sequential color output signals produced thereby into a parallel output as is required for compatible television transmission. Other techniques involve the use of from two to four sensors with modified color separation processes. These have met with varying degrees of experimental success.

Consideration has also been given in the past to the development of a color television camera utilizing a single sensor, i.e., a sensor requiring only a single image to be projected thereon for producing the requisite, separate color signal outputs. One such development comprises a single vidicon pick-up tube utilizing a common photoconductive material responsive to light of all the selected wavelengths as required for producing desired color signals. A striped filter is utilized for selecting the desired wavelength regions of the spectrum, and, for example, includes a repeating pattern of multiple red-blue-green stripes.

A major problem with this approach results from the fact that the vidicon must have in excess of 1,600 lines of horizontal resolution; as a result, the positional accuracy of the scanning electron beam must be known within 0.06 percent in order to avoid color contamination. The striped filter correspondingly must comprise over 1,600 individual filter stripes which must be precisely positioned within micro-inch accuracies. The availability and the expense of optical filters of the required characteristics thus present a further substantial problem in this approach. A single sensor system of this type therefore is impractical to manufacture and is very expensive, the filter itself contributing to the expense as a major cost item. The exacting tolerances which must be maintained in assembling the components also contributes to expensive and time-consuming manufacturing costs of such a camera and a high reject factor.

Other prior techniques include the use of color selective photoconductive materials arranged in various configurations with associated electrodes. One such prior art sensor is constructed of three sets of photoconductors and associated electrodes, the geometric arrangement of each set with respect to the others being such as to enable each set to respond to the incident image to be sensed. More particularly, the geometric arrangement of the sets provides for each receiving a portion of the incident image, whereby each set responds to produce a respectively corresponding, separate color output signal. The output signals are produced by scanning the sensor with an electron beam, the currents produced from each portion of each sensor, and constituting the output signals, being related to the intensity of the image incident thereon in the corresponding wavelength regions. Since only a fraction of the image is incident on each set, and each set responds only to a preselected wavelength region of the spectrum, the output signal levels produced are relatively low. Further, the arrangement of the successive sets must provide not only proper spacing to permit each set to receive a corresponding portion of the incident image, but must also permit scanning of each set by the electron beam. Further, the image and the scanning electron beam are incident on each set from opposite sides thereof, and only the portion of the photoconductor material in each set which is exposed to both the beam and the image is operative for producing output signals. This further contributes to low signal output levels. Further, adequate spacing must be afforded between the sets to permit the simultaneous incidence thereon of illumination from the image and of the scanning electron beam for producing the outputs, imposing stringent requirements for maintaining precise locations and relative positions of the elements of each set with respect to one another, and of the sets with respect to one another.

These and other defects and disadvantages of prior art color television sensors are overcome by the sensor of the present invention.

SUMMARY OF THE INVENTION

In accordance with the present invention, there is provided a color television sensor utilizing solid state semiconductor technology and which employs electron beam and/or X-Y mosaic switching for the scanning process. Although various alternative embodiments of the basic structure of the sensor of the invention are disclosed, a feature common to each thereof is the use of selective color absorption materials. The selective absorption characteristics of these materials are controlled in accordance with the desired regions of the spectrum to be sensed for producing color output signals, while each thereof remains substantially transparent to the remaining wavelengths of the spectrum. Such materials are of relatively recent origin as later specified herein, and many are still under development in the noted technology.

The invention is applicable not only to color television, and thus to a sensor operable in the visible spectrum, but also to a wide variety of simultaneous multicolor sensing applications. These other applications include, for example, visible and infrared, ultraviolet and infrared, or ultraviolet and visible spectrums. Applications in which these various multi-color sensing capabilities are of interest include analysis of various image characteristics such as camouflage detection, viable chlorophyll analysis of vegetation, and the like. The detailed description of the preferred embodiments of the invention contained herein is generally directed to the particular application of the sensor of the invention as used in color television cameras; it is to be understood, however, that the features of the invention are equally applicable to these other multi-color sensing functions.

Specific examples of suitable materials are provided in the detailed description of the invention. In general, specific semiconductor materials and particularly various of the well-known photoconductors may be used, as well as certain semiconducting glass layers and organic semiconductors of somewhat more recent origin. These latter classes of materials are particularly desirable in that they permit incorporating dyes into the layers of the sensors for further tailoring the photoresponse characteristics of the layer.

Structurally, the sensor of the invention comprises a plurality of layers of selected ones of the noted semiconductor materials exhibiting the described selective absorption characteristics; in a color television sensor, these characteristics, of course, correspond to predetermined wavelength regions of the visible spectrum. Associated with each layer is a plurality of contact elements arranged in a matrix configuration and defining elemental image areas in each layer in accordance with the effective intersections of the matrix of the contact elements. Whereas each semiconducting layer thus is disposed between a set or array of vertical parallel contact elements and an array of horizontal contact elements, each such array of contact elements located between two adjacent semiconducting layers is shared as one of the pair of contact elements for each of the adjacent semiconductive layers.

The color absorption characteristics of the three semiconducting layers used in a color television sensor therefore are selected to effect spectral delineation in the red, green, and blue regions of the visible spectrum, with sufficient differentiation therebetween that the desired signals for satisfying NTSC requirements may be separated by electronic processing. As before noted, each semiconductor material is tailored by processing to have a peak photoresponse in the desired wavelength region of the spectrum, absorbing photons with the desired wavelength in that region and yet passing those of other wavelengths required for the remaining regions of the spectrum.

In accordance with one embodiment of the invention, one of the semiconductor layers comprises a mosaic of photodiodes defining elemental image areas, and the other semiconductor layers comprise photoconductors affording variable resistance characteristics in corresponding elemental areas. Alternatively, all layers may be of the latter type. A shadow mask is also incorporated with the sensor to produce dark, and consequently high resistance, regions defining the elemental areas of the photoconductor layers. The shadow mask affords good isolation between the elemental areas without the need for junction or dielectric isolation. Isolation can also be obtained by forming the layers as individual image elements, although the shadow mask technique appears more desirable.

Scanning of the sensor is effected by a switching system associated with the matrices of contact elements. Alternatively, electron beam scanning may be utilized, with some slight modification of the contact element arrays of the sensor structure.

DETAILED DESCRIPTION OF THE INVENTION

Figure 1:
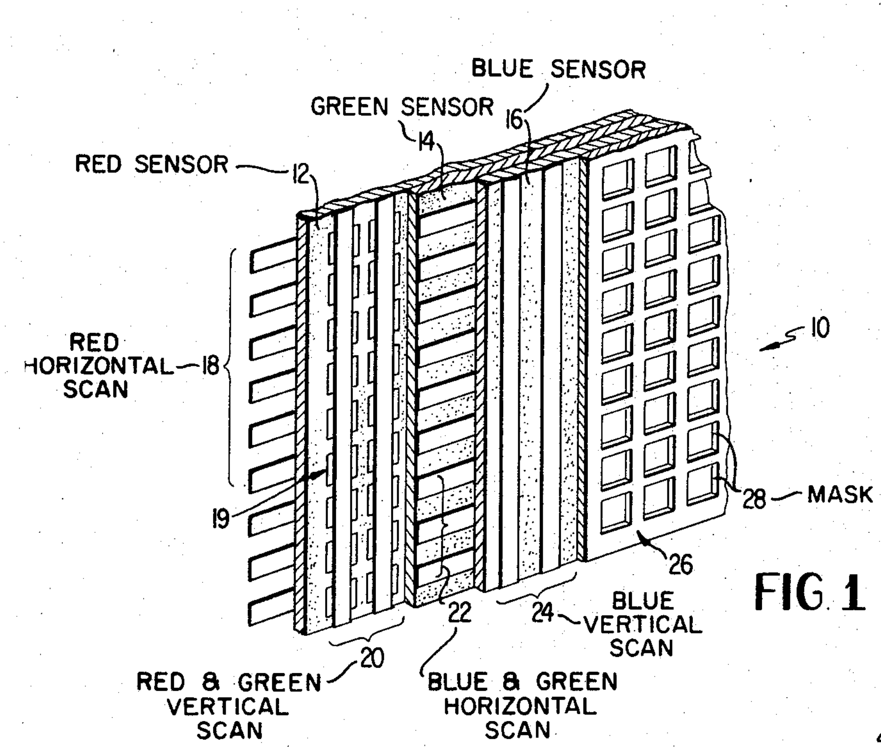
FIG. 1 comprises a perspective view of a multi-layer solid state sensor in accordance with the invention for detecting preselected wavelength regions of a spectrum.

In FIG. 1 is shown a preferred embodiment of a three color sensor suitable for use in a color television camera. As previously noted, however, and as hereinafter specified, the sensor of the invention is not limited to sensing colors in the visible spectrum for use in color television, but rather is readily adapted to any of various multi-color sensing functions.

The sensor 10 of FIG. 1 comprises a solid state sandwich-type or multi-layer construction wherein the plural layers respectively exhibit desired selective absorption characteristics, and grid-like arrays of conducting elements associated with the layers. THe conducting elements afford selective connections to the elemental image portions of the layers for use with an electrically switched scanning system, or alternatively may be interconnected to permit electronic beam scanning of the sensor. More particularly, the sensor 10 includes a first semiconductor layer 12 responsive to wavelengths of incident illumination in a first region of the spectrum to be detected, and second and third such layers 14 and 16 likewise of semiconductor materials and respectively responsive to different wavelength regions of the spectrum to be detected.

Associated with the first layer 12 are a first array 18 of horizontal, conductive contact elements and a second array 20 of vertically disposed such elements, defining with respect to the layer 12 a matrix of plural elemental areas of that layer.

A further array 22 of horizontal elements is provided intermediate the layers 14 and 16. The vertical elements of the array 20 and the horizontal elements of the array 22 similarly define a matrix of elemental areas of the layer 14. In like fashion, a fourth array of vertical elements 24 cooperates with the array of horizontal elements 22 to define a matrix of elemental areas of the layer 16.

Finally, a shadow mask 26 is provided containing a plurality of apertures 28, those apertures generally conforming to respectively corresponding elemental areas of the layers 12, 14, and 16 as defined by the respectively associated horizontal and vertical contact elements of the corresponding arrays.

Considering first the materials of the layers 12, 14, and 16, generally, they are selected such that one is sensitive to red, one to green, and one to blue. It is not essential that each layer have exactly the NTSC specified response characteristics or the exact CIE chromaticity coordinates required, because any variations or deficiencies of the particular materials as to their response characteristics can be compensated for by appropriate cross-matrixing of the electronic output signals from the layers of the sensor. The major requirement is simply that spectral delineation must occur in the red, green and blue regions of the spectrum with sufficient differentiation, such that the desired signals are separable by electronic processing.

Further, it is to be understood that the materials selected are of the semiconducting type and are, either inherently or by selective processing, controlled to have a peak photoresponse in a particular region of the spectrum such that the specified layers absorb photons of the desired wavelength and pass those of other wavelengths. This characteristic is defined herein as selective absorption.

Materials which are presently well known and which may be utilized to implement the sensor of the invention include, as one example, cadmium sulfide, utilized with appropriate introduction of impurities for two of the layers, and silicon for a third layer. More specifically, cadmium sulfide is an orange colored semiconductor which has, in its unaltered form, a spectral response characteristic in the blue-green region of the spectrum. It is almost completely transparent to the red to orange wavelength region of the visible spectrum. By well-known techniques, impurities may be introduced into cadmium sulfide to shift the spectral peak into the green region or into the blue region of the spectrum, as desired. Thus, two of the layers of the sensor of FIG. 1 and, as a specific example, the layers 14 and 16 may be produced utilizing these two types of doped cadmium sulfide.

The third, or final layer 12 may be produced from silicon. Silicon has an unaltered spectral peak in the red or near-infrared region and is a material well known to be particularly desirable for use as a red sensor in optical sensing systems. By using drift-field techniques and employing appropriate doping elements, the spectral peak of silicon can be sharpened and shifted practically at will to any point in the desired response region for red and particularly from the 0.6 to 1.1 micron range. Thus, silicon is ideally suited as the red sensor layer of the three color sensor of the invention. Silicon also affords a particularly desirable substrate onto which the two cadmium sulfide layers are deposited, in succession, affording respectively the blue and green sensor layers.

Whereas the arrays of contact elements have hereinbefore been described as defining elemental areas of the respectively associated semiconducting layers, in the particular embodiment of FIG. 1, the matrix defined by the arrays of contact elements is designed to conform to a mosaic of photodiodes formed in the silicon layer 12. That mosaic of photodiodes is produced by doping of the silicon layer 12 to define a PIN structure with opposing P+ and N+ regions or electrodes on either side of a high resistivity silicon wafer, and from which the layer 12 is formed. As noted, of course, that wafer is appropriately doped to achieve the desired spectral response. The mosaic of photodiodes is represented by the regions such as 19 each of which, and only for purposes of illustration, is illustratively shown as a square area defined in the layer 12 resultant from the doping process. Each of the PIN photodiodes is electrically isolated from one another within the layer 12. The photodiode mosaic thus defined by doping of the silicon layer 12 may alternatively be formed by epitaxial growth on the surface of a silicon wafer, the latter, however, typically requiring a somewhat thicker wafer than the doping construction.

Thus, the effective intersections of the contact elements of the arrays associated with each layer and disposed on opposite surfaces thereof correspond to the mosaic pattern of the photodiodes. In addition, the apertures 28 in the shadow mask 26 similarly are arranged to correspond to the mosaic pattern and thus to the array of elemental image areas in each layer. The shadow mask, by virtue of producing a dark grid pattern in the associated layers 14 and 16, when the sensor is illuminated by an image, thereby maintains a high resistance in those layers, affording isolation and minimizing cross-talk between adjacent elemental areas. The shadow mask thus affords good isolation, and eliminates the need of junction or dielectric isolation of the elemental areas within each layer and the attendant problems in producing such isolation.

Techniques for obtaining such requisite isolation of the elemental areas are known in the art and may be employed in lieu of the shadow mask if desired. As an example of an alternative technique, each of the layers may be formed by deposition of individual image elements corresponding to the elemental areas defined in the layers as above described. The use of shadow mask, however, permits construction of the sensor utilizing continuous photoconductor layers and thus is desirable from a manufacturing and reliability standpoint, providing a higher yield process.

The contact elements of the arrays 18, 20, 22, and 24 are provided by conventional techniques such as vacuum deposition processes. These elements are typically of gold, tin oxide, or aluminum and preferably are substantially transparent to the incident illumination. Thus, they may be of widths as large as the apertures 28 of the shadow mask 26 or larger or smaller, as desired. If sufficiently small, the transparency of these elements is less critical to the efficiency of the system.

As an alternative, interconnects to the P+ regions of the silicon layer 12 can be produced by suitable doped silicon regions, in lieu of the contact elements 18.

Figure 2:
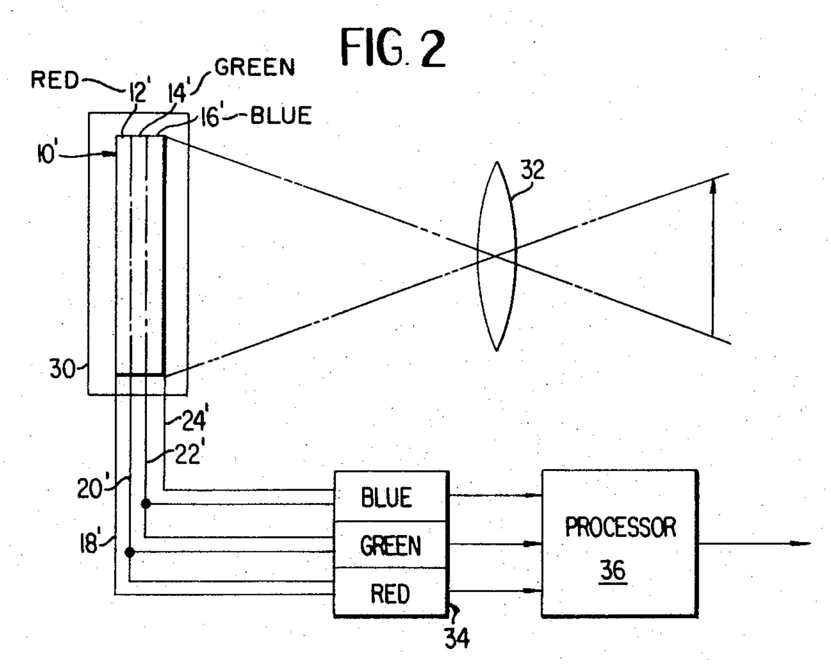
FIG. 2 comprises a block diagram of a color television camera and signal processing system utilizing the sensor of the invention, and wherein the sensor is scanned by an electronic switching system.

In FIG. 2 is shown diagrammatically a system utilizing the sensor 10 of FIG. 1. Particularly, the sensor, shown at 10', is suitably positioned within an hermetically sealed envelope 30 and has focused thereon by an optical system, illustrated by a lens 32, the image to be sensed. The layers of the sensor 10' are identified as 12', 14', and 16', corresponding to the similarly numbered, but unprimed, layers in FIG. 1. Such optical systems are well known in the art. Alternatively, the hermetically sealed envelope 30 may be deleted if the semiconductor regions are adequately passivated using techniques well known to the art.

Also shown in FIG. 2 is an electrical switching system 34 providing electrical energization and scanning of the sensor 10' to generate output electrical signals therefrom. The connections to the sensor 10' are identified as 18', 20', 22', and 24' and correspond to the arrays 18, 20, 22, and 24, respectively, of contact elements as shown in FIG. 1. Each of these connections as shown in FIG. 2, of course, represents the external connections to the plurality of contact elements in each array.

The scanning system 34 provides proper biasing for the various elemental areas and photodiodes of the array and additionally serves to electrically switch the contact elements in a conventional manner to effect a scan of the elemental areas of each layer of the sensor. The general scan function proceeds in accordance with well-known matrix scanning techniques and thus is not detailed. However, it will be appreciated that simultaneous scans of the three layers may be performed to achieve simultaneous output color signals readily adapted for electronic processing by processor 36 to produce a compatible color television output signal. Accordingly, it will be noted that the connections 18' and 20' associated with the layer 12' are connected to the scan system for the red color. In similar fashion, the connections 20' and 22' are supplied to the green scan system and the connections 22' and 24' are supplied to the blue scan system.

Considering the operation of the sensor 10, the image is initially incident on the layer 16'. The selective absorption characteristics of the layers, in accordance with the described arrangement of layers, provides for the layer 16' responding to and absorbing the radiation in the blue region and transmitting that in the green and red regions. Similarly, the layer 14' selectively absorbs radiation in the green region and transmits that in the red region to which the silicon layer 12' then responds. The photoconductive layers 14' and 16' accordingly are varied in their resistance characteristics in accordance with the intensity of the incident illumination in their respective response regions. The green and blue portions of the control system 34, effect addressing of the associated arrays of contact elements as provided by the connections 20' and 22', and 22' and 24', respectively, thereby scanning the elemental areas of these layers in a conventional matrix-type scan operation, to produce simultaneously from each layer an electrical signal varying in amplitude in accordance with the incident illumination at each elemental area for the associated wavelength region.

The photodiode mosaic of the layer 12, however, functions in a somewhat different manner. The photodiodes are typically reverse biased by the application of appropriate potentials to the associated contact element arrays 18' and 20'. The reverse biasing is variably overcome, and the individual photodiodes selectively rendered conductive at varying levels, as a function of the intensity of incident illumination in the red region on each thereof. This operation, of course, is conventional as to the response of photodiodes to incident illumination. The associated red portion of the scan system 34 operates through the connections 18' and 20' to effect a matrix-type scan of the individual photodiodes of the layer 12, simultaneously and in synchronism with the scanning of the layers 14' and 16', to derive the red output signal.

Processor 36 responds to the three-color output signals thus obtained to produce a simultaneous color television output signal as desired, such as one conforming to NTSC standards. As above noted, suitable matrixing and balancing circuits may be provided in either or both of the systems 34 and 36 in accordance with known techniques for compensating for any deficiencies in the output signals from the sensor layers in producing the desired output signal from the processor 36.

Figure 3:
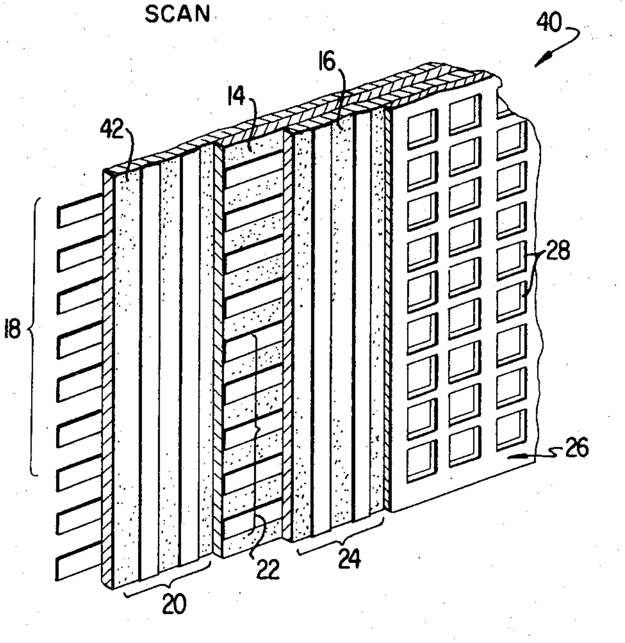
FIG. 3 comprises an alternative embodiment of the sensor of FIG. 1.

An alternative embodiment of the sensor of the invention is shown at 40 in FIG. 3 wherein the elements thereof identical to the sensor 10 of FIG. 1 are identified by identical numerals. The primary difference in the sensor 40 is that the layer 12 containing the mosaic of photodiodes 19 in FIG. 1 is now provided by a layer 42 of a continuous photoconductor structure similar to the layers 14 and 16, which are identical in each of FIGS. 1 and 3. Again, a shadow mask 26 is utilized to define the elemental areas in each layer as before described. In this instance, the layer 42 may again be formed of silicon to afford the red sensor layer. Further, the sensor 40 may be constructed without the use of a shadow mask 26 by isolating the elemental areas in accordance with the techniques hereinabove described.

Figure 4:
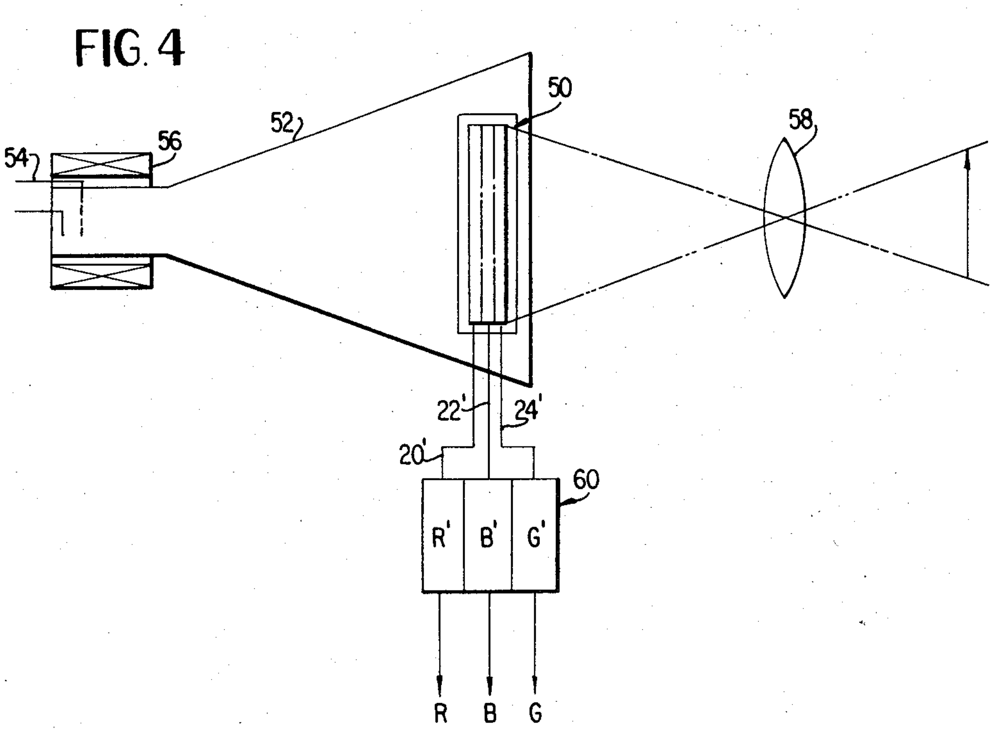
FIG. 4 comprises an alternative embodiment of a color television system utilizing the sensor of the invention and wherein the sensor is scanned by an electron beam.

The sensor of the invention may also be utilized in an electron beam scanning system in lieu of the matrix switching operation. Such a system is shown in FIG. 4. The sensor shown at 50, positioned within an evacuated envelope 52 also including a suitable electron gun 54. A deflecting system 56 controls the electron beam from gun 54 for scanning of the sensor 50. An optical system 58 projects the image to be scanned onto the sensor 50. In this instance, three outputs are derived from the sensor 50 labelled R', B', and G' and corresponding to the output signals from the three layers of the sensor formed in accordance with any of the foregoing embodiments of the invention.

When electron beam scanning of the sensor of the invention is utilized, and referring again to FIG. 1, the contact elements of the arrays 20, 22, and 24, respectively, are electrically interconnected in common to afford three output connections. The array 18 in this instance is not utilized, since biasing of the diodes thereof is achieved by the electron beam. The array 24' is then connected to ground and slight forward biasing potentials are applied to the arrays 22' and 20'. Charge depletion in the photodiode resultant from electron beam scanning is then overcome by the current flow from system ground through the arrays of contact elements and specifically through the elemental areas of the layers 16 and 14 associated with each such photodiode of the layer 12.

It will thus be appreciated that complex output signals R', B', and G' are produced from each layer and include components from the other layers, and that total current flow in each layer will also be a function of the conduction level in each of the associated elemental image areas defined by the layers 14 and 16 and by the photodiodes of the layer 12. A matrixing system 60 responds to the complex signals R′, B′, and G′ thus produced to subtract the undesired components from each thereof in a conventional manner and thereby produce the three separate color output signals shown as R, B, and G. These signals may then be processed to produce a desired color television output signal, as illustrated in FIG. 2.

In addition to the use of silicon and cadmium sulfide as above described, germanium, cadmium selenide, gallium arsenide, lead sulfide, and other well-known photoconductors widely used in present applications may be employed in the present invention as the semiconductor materials for the sensor layers. Further, two new photoconductor classes are now emerging which have characteristics ideally suited for the solid state sensor of the invention, and particularly glass semiconductors and organic semiconductors. The fabrication of the sensor of the invention using these new semiconductor materials provides a wider choice of photoresponse characteristics than is available with present commercially available materials. Another advantage of using glass or organic semiconductors is that dyes can be incorporated into the layers to further tailor the photoresponse characteristics thereof.

It will be apparent to those skilled in the art that numerous modifications and adaptations to the system of the invention may be made and thus it is intended by the appended claims to cover all such modifications and adaptions as fall within the true spirit and scope of the invention.

I claim as my invention:

1. A sensor responsive to an optical image of a given spectrum of illumination projected thereon, for producing electrical signals representative of that image in accordance with predetermined, corresponding wavelength regions of the spectrum, comprising:

a multi-layer semiconductor sandwich structure, each layer thereof comprising semiconducting material exhibiting selective absorption of a corresponding one of the predetermined wavelength regions of the spectrum, means defining and providing elemental image responsive areas in each of said layers, and electrically conductive means providing selective electrical connection to said elemental areas of each said layers for deriving an electrical signal from each said layer representing the intensity of illumination incident thereon in accordance with the image and for the corresponding wavelength region of the spectrum.

2. A sensor as recited in claim 1 wherein said means defining said elemental areas comprises a shadow mask positioned on the input side of said semiconductor structure.

3. A sensor as recited in claim 1 wherein said electrical conductive means comprise first and second arrays of plural contact elements respectively disposed on each said layer and defining a matrix with respect thereto, the effective matrix intersections of said contact elements of said first and second arrays corresponding to said elemental areas to provide selective electrical connection to each of said elements, for each of said layers.

4. A sensor as recited in claim 3 wherein said contact elements are vaporized material deposition.

5. A sensor as recited in claim 3 wherein each array of contact elements intermediate adjacent semiconductor layers provides one of said first and second arrays associated with each of said adjacent layers.

6. A sensor as recited in claim 1 for use as a color television sensor wherein said layers are responsive to respectively associated, predetermined wavelength regions of the visible spectrum corresponding to red, green, and blue colors.

7. A sensor as recited in claim 6 wherein:

said layer responsive to the red wavelength region comprises silicon.

8. A sensor as recited in claim 7 wherein one of said other layers comprises cadmium sulfide doped to exhibit a peak spectral response in the blue wavelength region of the visible spectrum, and another of said other layers comprises cadmium sulfide doped to exhibit a peak spectral response in the green wavelength region of the visible spectrum.

9. A sensor as recited in claim 7 wherein:

said silicon layer comprises a mosaic of photodiodes defining the elemental image areas of said layer.

10. A sensor as recited in claim 9 wherein said photodiodes include a doped first surface thereof to establish P+ regions and a doped second surface thereof to establish respectively corresponding N+ regions.

11. A sensor as recited in claim 9 wherein said means defining said elemental areas of each of said layers further comprises a shadow mask having apertures therein positioned in alignment with said photodiodes of said silicon layer and defining in the others of said semiconductor layers elemental areas corresponding to and aligned with said photodiodes of said silicon layer.

12. A sensor as recited in claim 1 wherein said elemental areas of each layer are arranged in a plurality of rows and the corresponding areas of said plural rows are aligned in columns, and wherein said electrical connection means for each of said layers comprise:

a first array of plural contact elements on one surface of said layer, the elements thereof electrically interconnecting the areas of a corresponding row, and a second array of plural contact elements on the opposite surface of that same said layer, the elements thereof electrically interconnecting the areas of a corresponding column.

13. A sensor as recited in claim 12 wherein for each array positioned intermediate adjacent semiconductor layers, the contact elements thereof effect electrical interconnection of the corresponding areas the both of said layers.

14. A sensor as recited in claim 1 wherein one of said layers comprises silicon and said silicon and said silicon layer provides a substrate for for said other layers.

15. A sensor as recited in claim 14 wherein a mosaic of photodiodes are doped portions of said silicon layer to define the elemental areas thereof.

16. A sensor as recited in claim 15 wherein said photodiodes are N+ doped regions of the surface having deposited thereon the successive semiconductor layers and by P+ doped regions of the opposite, exposed surface of said silicon layer in respectively corresponding positions to the N+ doped regions.

17. A sensor as recited in claim 16 wherein said electrical connection means for the exposed surface of said silicon layer comprises conductive doped regions interconnecting said P+ doped regions.

18. Apparatus for generating color representative electrical signals for a color television system comprising:

a sensor including first, second, and third layers of semiconductor material having selective absorption characteristics and exhibiting peak spectral responses in the predetermined wavelength regions of three corresponding colors to be derived from incident illumination on said sensor, each of said layers in succession substantially absorbing the incident radiation of the associated predetermined wavelength region and substantially transmitting the radiation of other wavelength regions, said layers having defined therein corresponding elemental image areas, means providing selective electrical connection to the elemental image areas of each of said layers, and means for scanning said electrical contact means for selectively and sequentially addressing each of said elemental areas in each layer to derive from each of said layers an electrical output signal representative of the respectively associated wavelength region of the illumination incident on said sensor.

19. Apparatus as recited in claim 18 wherein one of said layers of said sensor comprises silicon semiconducting material doped to provide photodiodes therein defining the elemental areas.

20. Apparatus as recited in claim 19 wherein:

another of said layers of said sensor comprises cadmium sulfide doped to exhibit a peak spectral response in the green wavelength region of the visible spectrum, and a further of said semiconductor layers comprises cadmium sulfide doped to exhibit a peak spectral response in the blue wavelength region of the visible spectrum.

21. Apparatus as recited in claim 18 wherein said sensor further includes a shadow mask having a plurality of apertures therein corresponding to said elemental areas of said layers and affording thereby isolation between adjacent elemental areas of said semiconductor layers.

22. Apparatus as recited in claim 21 wherein:

said first layer of semiconducting material comprises silicon doped to provide photodiodes therein defining the elemental areas of said silicon layer, and said shadow mask defines the elemental areas of said second and third layers of semiconducting material.

23. Apparatus as recited in claim 18 wherein said scanning means comprises electrical switching means connected to said electrical contact means of said arrays.

24. Apparatus as recited in claim 23 wherein said switching means includes means for synchronized, simultaneous scanning of the corresponding elemental areas of said layers to produce simultaneous electrical output color signals therefrom.

25. Apparatus as recited in claim 24 wherein there is further provided processing means responsive to the electrical output signals derived from each of said layers for producing a color television output signal.

26. Apparatus for generating color representative electrical signals for a color television system comprising:

a sensor including first, second, and third layers of semiconductor material having selective absorption characteristics and exhibiting peak spectral responses in the predetermined wavelength regions of three corresponding colors to be derived from incident illumination on said sensor, each of said layers in succession substantially absorbing the incident radiation of the associated predetermined wavelength region and substantially transmitting the radiation of other wavelength regions, said layers having defined therein corresponding elemental image areas, means providing electrical connection to the elemental image areas of each of said layers, one of said layers comprising a mosaic of photodiodes defining the elemental areas of that layer and corresponding to the elemental areas of the others of said layers, electron beam scanning means for scanning said sensor in a scan raster corresponding to the elemental areas, said beam being directed to the exposed surface of said layer containing said photodiodes, and means for deriving from said electrical contact means electrical output signals from the corresponding layers.

27. Apparatus as recited in claim 26 further comprising means for processing said electrical output signals derived from said layers to derive therefrom electrical output signals representing the intensity of incident illumination for the said three colors.

* * * * *